(12) United States Patent
Hsiao et al.

(10) Patent No.: US 6,271,851 B1
(45) Date of Patent: Aug. 7, 2001

(54) Z-BUFFER PRE-TEST FOR 3D GRAPHIC PERFORMANCE ENHANCEMENT

(75) Inventors: Chien-Chung Hsiao, Peng-Hu Hsien; Tsung-Feng Lee, Tainan Hsien, both of (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 0 days.

(21) Appl. No.: 09/596,981

(22) Filed: Jun. 20, 2000

Related U.S. Application Data

(63) Continuation-in-part of application No. 09/360,597, filed on Jul. 26, 1999.

(51) Int. Cl.[7] .................................................. G06T 15/40
(52) U.S. Cl. ................................................ 345/422; 345/426
(58) Field of Search ..................................... 345/419, 420, 345/421, 422, 423, 426, 424, 425

(56) References Cited

U.S. PATENT DOCUMENTS

| 4,961,153 | * | 10/1990 | Fredricson et al. | 364/521 |
| 5,596,686 | * | 1/1997 | Duluk, Jr. | 395/122 |
| 5,760,780 | * | 6/1998 | Larson et al. | 345/422 |
| 5,870,097 | * | 2/1999 | Snyder et al. | 345/426 |
| 5,914,721 | * | 6/1999 | Lim | 345/421 |
| 6,094,200 | * | 7/2000 | Oslen et al. | 345/422 |

* cited by examiner

*Primary Examiner*—Mark Zimmerman
*Assistant Examiner*—Enrique L Santiago
(74) *Attorney, Agent, or Firm*—Ladas & Parry

(57) ABSTRACT

The present invention discloses a method and system, which discards invalid pixels by using cache memories storing depth values of all pixels having inputted which satisfy a Z Test Mode. The present invention is applied in a three-dimensional graphic system, and uses a plurality of pre-test units to process input pixels in a parallel manner to avoid system performance degeneration due to sequential execution used in prior art. The plurality of pre-test units read the depth values stored in a pre-test Z cache in the system and compare them with the depth values of input pixels being processed according to the Z Test Mode. If the answer is yes, the input pixels are discarded. Otherwise, the content of the pre-test Z cache is updated.

4 Claims, 3 Drawing Sheets

Z-BUFFER PRE-TEST FOR 3D GRAPHIC PERFORMANCE ENHANCEMENT

This application is a continuation-in-part of Ser. No. 09/360,597 Jul. 26, 1999.

BACKGROUND OF THE INVENTION

1. Field of the Invention

The present invention relates to a method and system for deleting invalid pixels in a 3D computer graphic processing, especially relates to a method and system for deleting invalid pixels in a 3D computer graphic processing by comparing the depth values of the pixels stored in cache memories which satisfy a Z Test Mode with the depth values of input pixels being processed.

2. Description of the Related Art

Referring to FIG. 1, the Z-buffer pre-test system for 3D graphic performance enhancement disclosed in U.S. Ser. No. 09/360,597, which was filed by the applicant, comprises a FIFO 7, a pre-test Z cache 11, a Pre-test Z module 8, a validity-test module 9, a Z-buffer cache 14, a Z-buffer test module 10, a frame buffer memory 13 and a control logic 6. The FIFO 7 is used to store the input pixels being processed. The pre-test Z cache 11 is used to store the depth values of all pixels having been inputted according to a Z Test Mode. The pre-test Z module 8 is used to compare the depth values of input pixels being processed with the depth values stored in the pre-test Z cache 11 according to the Z Test Mode. If the answer is yes, the content of the pre-test Z cache is updated. If the answer is no, the input pixels are discarded. The validity-test module 9 is used to process a series of tests, such as a scissor test for determining if an input pixel being processed is inside or outside a view port on the screen, such as an alpha test for comparing the alpha value of an input pixel being processed with the predefined alpha value of the system to determine if the input pixel should be discarded, such as a stencil test for comparing a reference value of an input pixel being processed with a parameter stored in a stencil buffer modified by instructions to determine if the input pixel being processed should be discarded. The Z-buffer cache 14 is used to store the depth values of all pixels having been inputted according to the Z Test Mode. The Z-buffer test module 10 is used to compare the depth values of input pixels being processed with the content of the Z-buffer cache 14 according to the Z Test Mode. If the answer is yes, the Z-buffer cache 14 is updated. If the answer is no, the input pixel being processed is discarded. The frame buffer memory 13 is used to store all pixels having passed validity tests. The validity tests include all functions of a depth test, scissor test, alpha test and stencil test mentioned above. The control logic 6 can further comprise a state machine 12 for managing the operations of all components simultaneously.

The original application can be further improved to meet all needs of a 3D computer graphic system. For example, there is a shading process for generating smooth colors in a 3D image processing. The shading process will generate a plurality of parallel input pixels simultaneously. Under the circumstance, the original application will slow down the executing speed if using a sequential process for the plurality of parallel input pixels.

SUMMARY OF THIS INVENTION

The object of the present invention is to eliminate the drawback of slow executing speed for a plurality of parallel input pixels in original application. To this end, the present invention provides a method and system which process the parallel input pixels by a plurality of pre-test units in advance. The plurality of pre-test units are used to compare the depth values of input pixels with the depth values stored in the pre-test Z cache according to a Z Test Mode. If the answer is yes, the input pixels pass and are displayed later. Otherwise, the input pixels are discarded. The Z Test Mode has eight kinds of practical applications, that are "never pass", "if $Z_{new} > Z_{dst}$ then pass", "if $Z_{new} \geq Z_{dst}$ then pass", "if $Z_{new} = Z_{dst}$ then pass", "if $Z_{new} \neq Z_{dst}$ then pass", "if $Z_{new} < Z_{dst}$ then pass", "if $Z_{new} \leq Z_{dst}$ then pass" and "all pass", wherein $Z_{new}$ is the depth value of the input pixel being processed, $Z_{dst}$ is the depth value of the pixel having been inputted which is stored in the pre-test Z cache.

In one aspect, the present invention mainly comprises steps (a) to (c) and is used to enhance the performance of a three-dimensional graphic system. The three-dimensional graphic system includes a pre-test Z cache, a pre-test Z module, a control logic, a Z-buffer cache and a frame buffer memory. The pre-test Z cache and Z-buffer cache store depth values of all pixels having been inputted which satisfy the Z Test Mode. In step (a), it is determined if input pixels being processed are in said pre-test Z cache and Z-buffer cache. In step (b), the operations of said frame buffer memory, pre-test Z cache and Z-buffer cache are controlled by said control logic according to the results of step (a). In step (c), the depth values stored in said pre-test Z cache are compared with the depth values of the input pixels being processed by said pre-test Z module. If the comparing result does not satisfy the Z Test Mode, the input pixels are discarded. Otherwise, the depth values of the input pixels being processed are written to the pre-test Z cache.

In another aspect, the present invention mainly comprises a FIFO, a pre-test Z cache, a pre-test Z module, a validity-test module, a Z-buffer cache, a Z-buffer test module, a frame buffer memory and a control logic. The FIFO is used to store a plurality of input pixels being processed. The pre-test Z cache is used to store depth values of all pixels having been inputted which satisfy the Z Test Mode. The pre-test Z module, including a plurality of pre-test units, is used to compare the depth values of the input pixels at the output end of the FIFO with the depth values stored in the pre-test Z cache. If the comparing result does not satisfy the Z Test Mode, the input pixels are discarded. Otherwise, the depth values of the input pixels being processed are written to the pre-test Z cache. The validity-test module, connected to the plurality of pre-test units, is used to execute validity-test functions for the input pixels being processed. The Z-buffer cache, connected to the pre-test Z cache, is used to store the depth values of input pixels having been inputted which satisfy the Z Test Mode. The Z-buffer test module, connected to the Z-buffer cache and validity-test module, is used to compare the depth values of pixels passing through said validity-test module with the depth values stored in the pre-test Z cache. If the comparing result does not satisfy the Z Test Mode, the input pixels are discarded. Otherwise, the depth values of the input pixels are written to the pre-test Z cache. The frame buffer memory, connected to said Z-buffer cache, pre-test Z cache and validity-test module, is used to store all pixels having passed through validity tests. The control logic is used to manage operations of said FIFO, pre-test Z cache, Z-buffer cache and frame buffer memory. The improvement resides in that said pre-test Z module includes a plurality of pre-test units, which compare the depth values stored in said pre-test Z cache with the depth values of the input pixels being processed in a parallel manner to enhance the efficiency of said graphic system.

The present invention can also be implemented by software. Because of simplicity and less operations of the structure of the present invention, the implementation by software also has the advantage as above-mentioned.

BRIEF DESCRIPTION OF THE DRAWINGS

This invention will be described according to the accompanying drawings in which.

PREFERRED EMBODIMENT OF THIS INVENTION

In the rendering process of a 3D computer graphic system nowadays, whether a pixel is displayed or not depends on the results of validity tests. When a pixel needs to be discarded due to not passing validity tests, the system still takes a lot of actions of memory accesses, and therefore wastes much system resources. If we can prevent the invalid pixels from entering the rendering process, a lot of unnecessary memory accesses can be avoided and therefore the system performance is enhanced. In a 3D computer graphic nowadays, a depth test is the most popular technology to erase hidden surfaces in a rendering process. Within the rendering process, the present invention proposes a method and system to enhance the system performance by using cache memories storing depth values of all the pixels having been inputted according to a Z Test Mode to discard invalid pixels in advance.

If we represent the depth value in a range of 0 to 1, then an object closer to human eyes has a smaller depth value and an object farther to human eyes has a larger depth value. The above representation is called "normal mode." Usually, an image processing application program will execute a Z Test Mode, which will probability change the above setting. For example, an object closer to human eyes is set to have a larger depth value and an object farther to human eyes is set to have a smaller depth value. The above representation is called "reverse mode." In general, the Z Test Mode can be classified as eight kinds of practical applications, which are "never pass", "if $Z_{new} > Z_{dst}$ then pass", "if $Z_{new} \geq Z_{dst}$ then pass", "if $Z_{new} = Z_{dst}$ then pass", "if $Z_{new} \neq Z_{dst}$ then pass", "if $Z_{new} < Z_{dst}$ then pass", "if $Z_{new} \leq Z_{dst}$ then pass" and "all pass", wherein $Z_{new}$ is the depth value of the input pixel being processed, $Z_{dst}$ is the depth value of the pixel having been inputted which is stored in the pre-test Z cache. The normal mode mentioned above is equal to "if $Z_{new} < Z_{dst}$ then pass", and the reverse mode mentioned above is equal to "if $Z_{new} > Z_{dst}$ then pass". The following embodiments are suitable to each one of the Z Test Modes.

Figure 1:
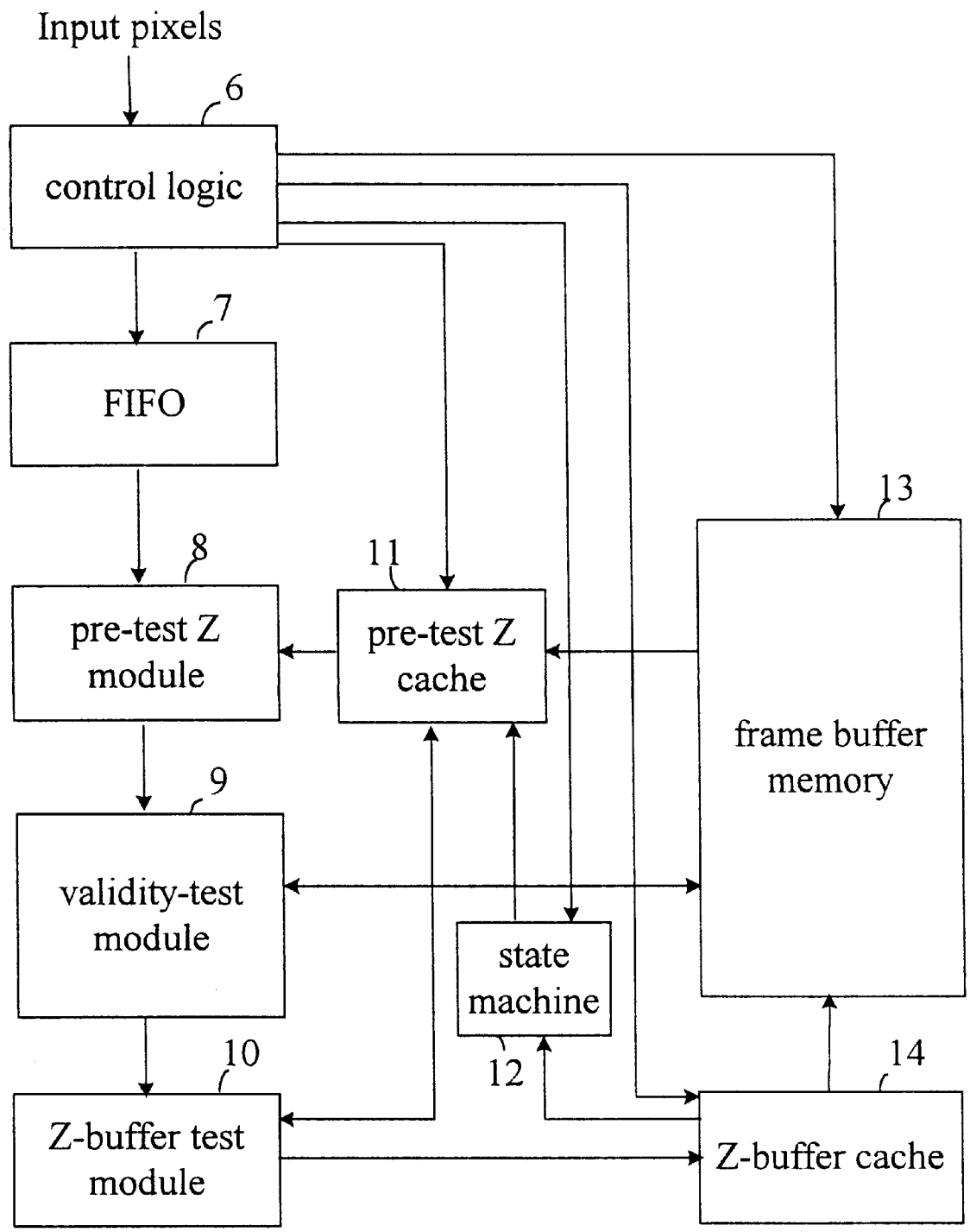
FIG. 1 shows a structure diagram of the original patent application.
Figure 2:
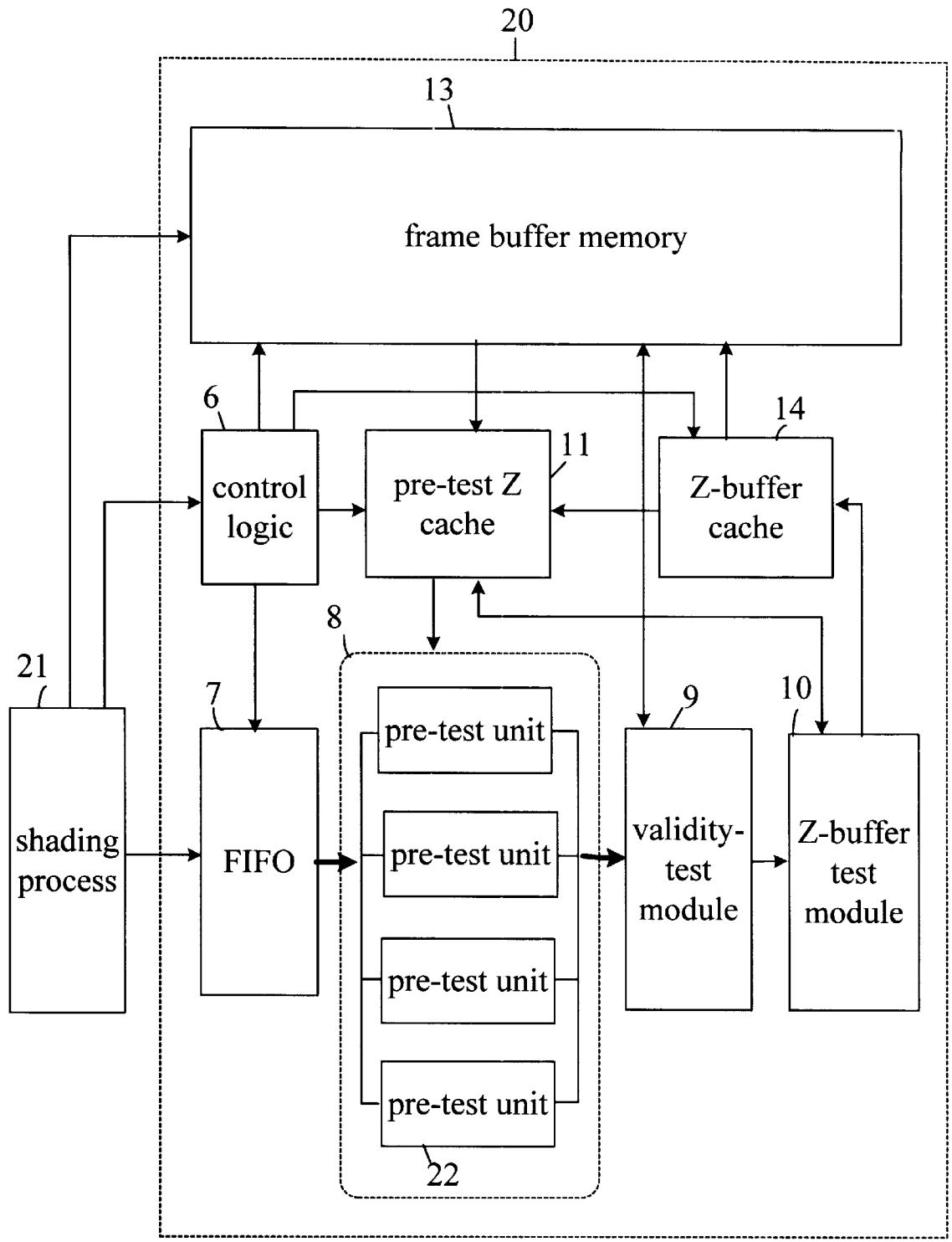
FIG. 2 shows a structure diagram of a system according to one embodiment of the present invention.

FIG. 2 shows a structure diagram of a system according to one embodiment of the present invention. The present invention is especially suitable to deal with a plurality of parallel input pixels. For example, a shading process 21 in a 3D computer graphic system usually generates a plurality of parallel input pixels. The graphic system 20 of the present invention improves the pre-test Z module 8 of the original application by using a plurality of pre-test units 22. The plurality of pre-test units 22 are used to compare the depth values of the parallel input pixels with the depth values stored in the pre-test Z cache 11 according to the Z Test Mode. If the answer is yes, the content of the pre-test Z cache 11 is updated. If the answer is no, the input pixels are discarded.

Figure 3:
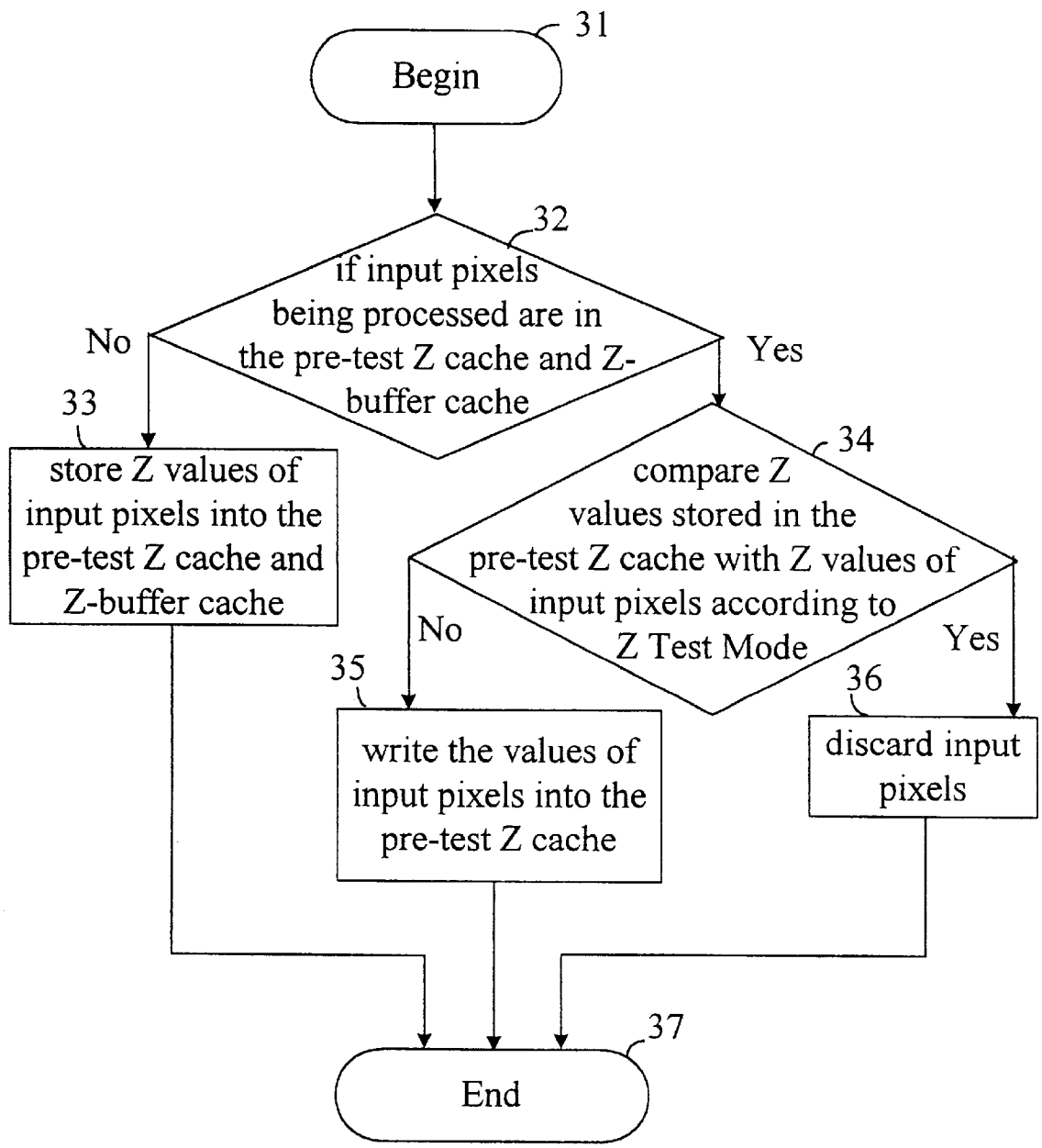
FIG. 3 shows a flow chart according to one embodiment of the present invention.

FIG. 3 shows a flow chart according to one embodiment of the present invention. In step 31, the flow of the present invention begins. In step 32, if input pixels being processed are in the pre-test Z cache and Z-buffer cache is determined. If the answer of step 32 is no, in step 33, depth values of input pixels are stored into the pre-test Z cache and Z-buffer cache. If the answer of step 32 is no, in step 34, if depth values stored in the pre-test Z cache and depth values of the input pixels are satisfied with the Z test mode is determined in a parallel manner in one cycle of the graphic system to enhance the efficiency of the graphic system. If the answer of step 34 is no, in step 35, the values of input pixels are written into the pre-test Z cache. If the answer of step 34 is yes, in step 36, the input pixels are discarded. In step 37, the flow of the present invention ends.

We suppose that the number of input pixels generated by the shading process 21 is m in one cycle, the number of output pixels of the pre-test Z module 8 including a plurality of pre-test units 22 is n in one cycle, the hit ratio of the pre-test Z cache 11 is p, the fault rate of the pre-test Z cache 11 is 1-p, and there are N pixels to be processed in the rendering process. If there are not the plurality of pre-test units 22, the rendering process will take N/n cycles to complete. If there are the plurality of pre-test units 22, the rendering process will only take N×p/n+N×1-p/m cycles to complete. In other words, the ratio of time spent in rendering processes between the state with the pre-test units and the state without pre-test units is p×(1-n/m)+n/m. Therefore, the efficiency of executing the rendering process can be improved by increasing the ratio of m/n and the hit ratio of the pre-test Z cache. For example, if m is equal to 4, n is equal to 2, and ratio is equal to 60%, then the efficiency is improved by 20%; if m is equal to 4, n is equal to 2, and the hit ratio is equal to 20%, then the efficiency is improved by 40%; if m is equal to 8, n is equal to 1, and the hit ratio is equal to 20%, then the efficiency is improved by 70%. Table 1 is a summary of test results with parameters m, n and hit ratio of the pre-test Z cache.

TABLE 1

| m | n | hit ratio of the pre-test Z cache | time rate (new structure/ old structure) | enhanced efficiency rate |
|---|---|---|---|---|
| 1 | 1 | 10% | 1.00 | 0 |
| 2 | 2 | 20% | 1.00 | 0 |
| 2 | 2 | 40% | 1.00 | 0 |
| 4 | 2 | 20% | 0.60 | 40% |
| 4 | 2 | 40% | 0.70 | 30% |
| 4 | 2 | 60% | 0.80 | 20% |
| 4 | 2 | 80% | 0.90 | 10% |
| 4 | 2 | 100% | 1.00 | 0 |
| 8 | 1 | 20% | 0.30 | 70% |
| 8 | 1 | 40% | 0.48 | 52% |
| 8 | 1 | 60% | 0.65 | 35% |
| 8 | 1 | 80% | 0.83 | 17% |
| 8 | 1 | 100% | 1.00 | 0 |

The above-described embodiments of the present invention are intended to be illustrated only. Numerous alternative embodiments may be devised by those skilled in the art without departing from the scope of the following claims.

What is claimed is:

1. A method of removing hidden surfaces for reducing memory access and thus improving the performance of a three-dimensional graphic system, said three-dimensional graphic system including a pre-test Z cache, a pre-test Z module, a control logic, a Z-buffer cache and a frame buffer memory, said pre-test Z cache and Z-buffer cache storing depth values of all pixels having been inputted which satisfy a Z Test Mode, the method comprising the following steps:

(a) determining if input pixels being processed are in said pre-test Z cache and Z-buffer cache;

(b) controlling operations of said frame buffer memory, pre-test Z cache and Z-buffer cache by said control logic according to the results of step (a); and (c) said pre-test Z module comparing the depth values stored in said pre-test Z cache with the depth values of the input pixels being processed in a parallel manner to enhance the efficiency of the graphic system; if the comparing result does not satisfy the Z Test Mode, the input pixels being discarded; otherwise, the depth values of the input pixels being written to said pre-test Z cache.

2. The method of claim 1, wherein said pre-test Z module is applied in a shading process of said three-dimensional graphic system.

3. A system of removing hidden surfaces for reducing memory access and thus improving the performance of a three-dimensional graphic system, comprising:

a FIFO for storing a plurality of input pixels being processed;

a pre-test Z cache for storing depth values of all pixels having been inputted which satisfy a Z Test Mode;

a pre-test Z module including a plurality of pre-test units, said pre-test units comparing the depth values stored in said pre-test Z cache with the depth values of the input pixels at the output end of the FIFO in a parallel manner to enhance the efficiency of said graphic system; if the comparing result does not satisfy the Z Test Mode, the input pixels being discarded; otherwise, the depth values of the input pixels being written to said pre-test Z cache;

a validity-test module connected to said pre-test Z module for executing validity-test functions for the input pixels being processed;

a Z-buffer cache connected to said pre-test Z cache for storing depth values of all pixels having been inputted which satisfy the Z Test Mode;

a Z-buffer test module connected to the Z-buffer cache and validity-test module for comparing the depth values of input pixels passing through said validity-test module with the depth values stored in the Z-buffer cache; if the comparing result does not satisfy the Z Test Mode, the input pixels being discarded; otherwise, the depth values of the input pixels being written to said pre-test Z cache;

a frame buffer memory connected to said Z-buffer cache, pre-test Z cache and validity-test module for storing all pixels having passed through validity tests; and a control logic for managing operations of said FIFO, pre-test Z cache, Z-buffer cache and frame buffer memory.

4. The system of claim 3, wherein said plurality of pre-test units are applied in a shading process of said three-dimensional graphic system.

* * * * *